United States Patent [19]
Cassidy

[11] Patent Number: 5,258,108
[45] Date of Patent: Nov. 2, 1993

[54] FLUID-TREATMENT AND CONDITIONING APPARATUS AND METHOD

[75] Inventor: Stephen Cassidy, Attleboro Falls, Mass.

[73] Assignee: Blue Star Technologies, Ltd., Lexington, Mass.

[21] Appl. No.: 815,285

[22] Filed: Dec. 27, 1991

[51] Int. Cl.$^5$ .............................. C25F 5/00; C02F 1/46
[52] U.S. Cl. .................................... 204/150; 204/275; 204/248; 204/249; 204/293
[58] Field of Search ............... 204/150, 275, 293, 248, 204/249

[56] References Cited

U.S. PATENT DOCUMENTS

| | | | |
|---|---|---|---|
| 2,700,647 | 1/1955 | Welcker | 204/149 |
| 3,448,034 | 6/1969 | Craft et al. | 204/197 |
| 3,486,999 | 12/1969 | Craft | 204/197 |
| 3,766,036 | 10/1973 | McKaveney | 204/150 |
| 3,852,175 | 12/1974 | Hoekje | 204/98 |
| 4,247,398 | 1/1981 | Mohri | 210/222 |
| 4,429,665 | 2/1984 | Brown | 123/3 |
| 4,606,828 | 8/1986 | Wells | 210/696 |
| 4,713,159 | 12/1987 | Truitt et al. | 204/197 |
| 4,959,155 | 9/1990 | Gomez | 210/687 |
| 5,167,782 | 12/1992 | Marlow | 204/168 |

FOREIGN PATENT DOCUMENTS 2377454  9/1978  France ............................... 204/293

OTHER PUBLICATIONS

"Catalytic Water Conditioning," published in *Water Conditioning and Purification* (Feb. 1987).
E.S.P.I., Aqualizer Sales Literature (Mar. 1991).
CSA, Caribbean Clear Pool Purifier sales literature.
Fre-Flo Water Systems, Inc. sales literature.
Care Free Water Products, Inc. sales literature.
Moltek Environmental, Inc. sales literature.
Excerpt from Real Goods, Summer-Fall 1990.

*Primary Examiner*—John Niebling
*Assistant Examiner*—Arun S. Phasge
*Attorney, Agent, or Firm*—Cesari and McKenna

[57] ABSTRACT

Apparatus and methods for conditioning of fluids such as water, aqueous solutions and fuel compositions. The fluid to be treated is brought into contact with an alloy comprising zinc, manganese, copper, a precious metal and silicon. The alloy may be electrically connected to earth ground during operation.

11 Claims, 1 Drawing Sheet

FLUID-TREATMENT AND CONDITIONING APPARATUS AND METHOD

BACKGROUND OF THE INVENTION

A. Field of the Invention

The present invention relates generally to apparatus and methods for treating and conditioning liquids, in particular water.

B. Description of the Related Art

The need to preserve adequate supplies of pure, potable water has engendered a number of approaches to water purification. These approaches reflect the increasing environmental stress imposed by modern industrial society, and the difficulty of isolating water sources and reservoirs from the effects of such stress. For example, acid rain produced by smokestack discharge can adversely affect the chemical composition of waters far removed from the site of the actual discharge by altering pH levels and causing dissolution of heavy metals that would otherwise lie dormant.

Current treatment methods frequently involve addition of chemicals such as chlorine gas, bleach, sodium hydroxide, ozone, sodium fluoride or sodium hexametaphosphate. Unfortunately, the net result is often replacement of one set of chemical contaminants with another, less offensive set that the public consumes through drinking and cooking Furthermore, the efficacy of treatment chemicals is usually limited both by their intrinsic properties and safe concentration levels.

The need for fluid conditioning can arise from concerns other than water potability. For example, many industries employ large quantities of treatment chemicals in an effort to reduce corrosion and fouling of equipment such as boilers, cooling towers, refrigerators and compressors; similar treatment of fuel compositions can enhance combustion efficiency. The chemicals employed in these processes and their byproducts are ultimately introduced into the environment as effluent or exhaust.

As an alternative to chemical treatment, practitioners in the art have developed certain metal alloys which, when brought into contact with an impure fluid, produce various beneficial effects; see, e.g., U.S. Pat. Nos. 4,429,665 and 4,959,155. The mechanism by which these alloys produce such effects is not clearly understood, rendering their identification largely a matter of experimental effort. Also for this reason, the effect of substituting alloy components or adjusting their ranges cannot readily be predicted from traditional metallurgy concepts, nor can it be assumed that different alloys will provide similar types of conditioning effects.

Alloy-based fluid-conditioning systems can operate catalytically or sacrificially; in the latter case, the alloy core gradually disintegrates into the water to be treated. Although catalytic systems are obviously preferable, it is not generally possible to tell, merely from structural and metallurgical description of an apparatus, whether it retains integrity during operation.

DESCRIPTION OF THE INVENTION

A. Objects of the Invention

Accordingly, it is an object of the present invention to provide improved methods and apparatus for conditioning fluids such as water.

It is another object of the invention is to provide fluid-conditioning methods and apparatus that operate catalytically.

It is a further object of the invention to provide fluid-conditioning methods and apparatus that are conveniently installed and employed, and are versatile in operation.

Other objects will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts which are adapted to effect such steps, all as exemplified in the following detailed description, and the scope of the invention will be indicated in the claims.

B. Brief Summary of the Invention

In accordance with the present invention, fluids are passed over a formed metal alloy (preferably contained within a chamber for continuous-flow treatment) to facilitate conditioning thereof. As used herein, the term "fluids" includes, but is not limited to, water, aqueous solutions and fuel compositions.

The conditioning effects produced by the present invention include mitigation of corrosion or other oxidative processes (e.g., in piping systems), reduction of scale in hot-water systems and inhibition of heavy-metal solubility. The present invention also retards growth of bacteria by reducing water hardness, thereby lowering the available nutrient level.

An important feature of the present invention is grounding of the exterior surface of the chamber in which the alloy core resides when the invention is used to treat water. Without being bound to any particular theory or mechanism, it is believed that the grounded alloy core operates catalytically by facilitating (i.e., reducing the energy associated with) transfer of electrons from earth ground to water and/or particulate matter suspended therein. During operation this results in a potential difference from ground at the surface of the catalytic core, and a constant flow of current as electrons transferred at the core surface are transported away with the fluid. However, for treating fluids such as fuels, it may be desirable to refrain from grounding the core; the mechanism by which fluids are conditioned in the absence of grounding is uncertain.

C. Brief Description of the Drawings

The foregoing discussion will be understood more readily from the following detailed description of the invention, when taken in conjunction with the accompanying drawings, in which.

D. Detailed Description of the Invention

Figure 1:
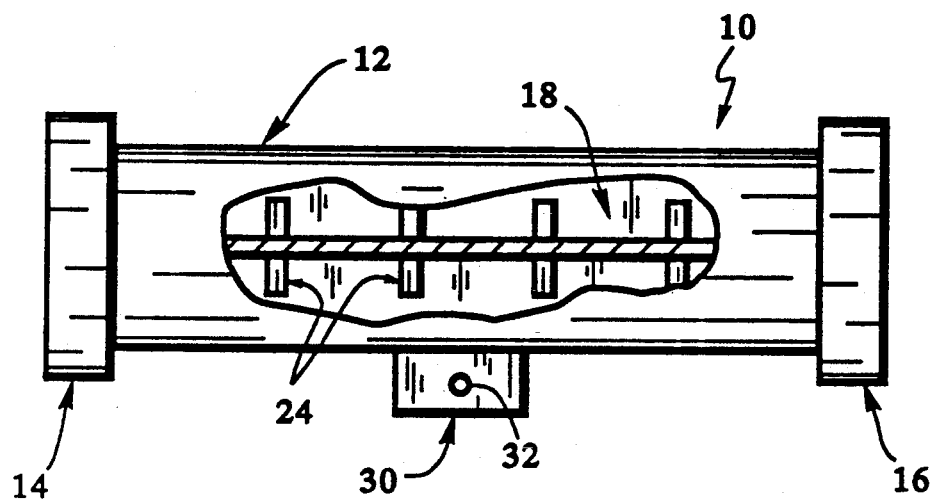
FIG. 1 is a cutaway side view of a device embodying the present/invention.
Figure 2:
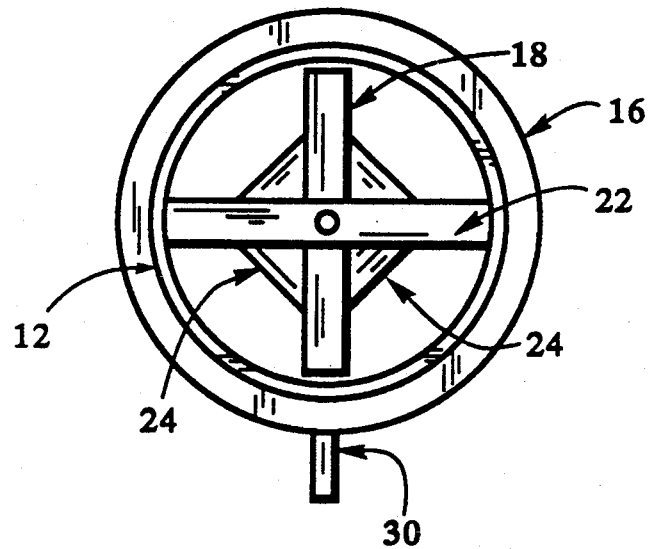
FIG. 2 is an end view of the device depicted in FIG. 1.

Refer first to FIG. 1, which illustrates a representative embodiment of the present invention. As shown therein, a device 10 includes a housing 12 and two ports 14, 16. Housing 12 is constructed from conductive, preferably durable material such as standard metal plumbing material (e.g., steel, stainless steel, copper, brass, bronze or aluminum). Port 14, for convenience designated the input port, receives a fluid stream (generally under pressure) into housing 12. The incoming fluid makes contact with an alloy core 18, which is contained within and secured to housing 12 by means of attachment bars at either end of core 18. One of these bars, denoted by reference numeral 22, is shown in FIG. 2. The attachment bars are preferably conductive, and may be fabricated from material similar to that of housing 12. Treated fluid passes out of housing 12 through port 16, for convenience designated the exit port.

Core 18 is of generally cruciform shape with a series of wedge-shaped fins or baffles 24 evenly spaced along its length. Although this configuration is preferred, its function is to present a high surface area to the incoming fluid and to create turbulent flow within housing 12. Both of these effects improve the action of core 18 on incoming fluid. Accordingly, it is possible to utilize other baffling configurations in lieu of that just described, such alternative designs being well within the purview of those skilled in the art.

Housing 12 is also provided with means for establishing an earth ground. In the embodiment shown in FIG. 1, such means consists of a tab 30 having an aperture 32. During operation of the device, a conductive cable in electrical contact with earth ground is connected to tab 30 via aperture 32. This electrical connection, in combination with conductive housing 12 and the core attachment bars, couples core 18 to the earth ground.

Fluid entering housing 12 interacts with the surface of the grounded core 18, where conditioning takes place. As stated previously, it is believed that such conditioning results from catalytic action involving transfer of electrons from earth ground. Thus, the primary criterion for suitability of a material for core 18 is its ability to produce the conditioning effects that lie at the heart of the invention.

However, it is also important for core 18 to exhibit durability over a reasonable useful life, and resist degradation from the effects of turbulent flow. In addition, while core 18 is preferably formed by casting, the alloy should lend itself to machining or other fabrication processes.

Preferred alloy compositions include a precious metal (e.g., silver, palladium, platinum, gold, rhodium, iridium, ruthenium or osmium) and a mixture of other metals that promote conditioning and/or the other desirable attributes discussed above. In the preferred embodiment, the precious metal is silver, although substitution for a different precious metal will not materially affect performance. Alloys suitable for use in the present invention include the following constituents in the ranges listed:

| | |
|---|---|
| Silver | 0.25-2% |
| Copper | 45-70% |
| Manganese | 18-25% |
| Zinc | 5-30% |
| Silicon | 0-5% |
| Molybdenum | 0-3% |
| Titanium | 0-5% |
| Tungsten | 0-3% |

Various modifications to the above formulation are possible. For example, silicon has been found to be an unusual and highly advantageous additive. It appears both to enhance durability and to modulate the electrical characteristics of core 18. However, because silicon is not a metal, it is absent from the active elements of all water-conditioning apparatus of which I am aware. It is possible, within the scope of the present invention, to eliminate silicon entirely or replace it with another semiconductor material, but silicon currently appears optimal with respect to the durability and electrical properties just mentioned.

The role of tungsten is to promote machinability (e.g., to tap core 18 to facilitate attachment thereto of core-attachment bar 22); if this property is found to be unnecessary, tungsten can be eliminated. It should be emphasized that this formulation omits the traditional alloy materials nickel, tin, aluminum and lead, the latter posing significant environmental hazards.

Optimal results have been obtained with an alloy having the following constituents:

| | |
|---|---|
| Zinc | 20.24% |
| Manganese | 22.0% |
| Copper | 54.12% |
| Silver | 1.0% |
| Silicon | 2.64% |

The apparatus of the present invention is conveniently installed into a variety of one-way or continuous-flow piping systems by providing ports 14, 16 with the necessary threads, unions, couplings or other means of attachment. The diameter of housing 12 and the size of core 18 can obviously be varied to accommodate different flow rates.

During operation, an electrical potential develops between the surface of core 18 and earth ground. Using the alloy set forth above in a suitable grounded pipe, electric potentials as high as 2 volts have been observed between the surface of core 18 and ground. This apparatus was also found to reduce corrosion, scale buildup and water hardness.

It will therefore be seen that we have developed an improved water-conditioning device and method, which can be utilized with a variety of fluids to address a range of deficiencies. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fluid-treatment device comprising:
   a. a conductive housing including inlet and outlet means;
   b. means for electrically the housing to earth ground;
   c. a core electrically connected to the housing and disposed therein so as to contact fluid entering the housing through the inlet means as it passes through the housing, wherein the core is an alloy comprising zinc, manganese, copper, a precious metal and silicon but not lead, and wherein the device is not supplied with electricity by an outside electrical source.

2. The device of claim 1 wherein the alloy consists essentially of 0.25-2% silver, 45-70% copper, 18-25% manganese, 5-30% zinc and up to 5% silicon.

3. The device of claim 2 wherein the alloy consists essentially of 20.24% zinc, 22.0% manganese, 54.12% copper, 1.0% silver and 2.64% silicon.

4. The device of claim 1 wherein the alloy further comprises at least one metal selected from the group consisting of molybdenum, titanium and tungsten.

5. The device of claim 1 wherein the core is configured to present a relatively high surface area to and cause turbulence within fluid entering through the inlet means and exiting through the outlet means.

6. A method for conditioning a fluid, comprising the steps of:
   a. providing a conductive housing including inlet and outlet means;
   b. passing fluid to be treated through said housing so as to bring the fluid into direct contact with a core of an alloy comprising zinc, manganese, copper, a precious metal and silicon but not lead;
   c. withdrawing a treated fluid from the outlet means and wherein the device is not supplied with electricity by an outside electrical source.

7. The method of claim 6 wherein the alloy consists essentially of 0.25-2% silver, 45-70% copper, 18-25% manganese, 5-30% zinc and up to 5% silicon.

8. The method of claim 7 wherein the alloy consists essentially of 20.24% zinc, 22.0% manganese, 54.12% copper, 1.0% silver and 2.64% silicon.

9. The method of claim 6 wherein the alloy further comprises at least one metal selected from the group consisting of molybdenum, titanium and tungsten.

10. The method of claim 6 wherein the fluid is brought into contact with the alloy under turbulent conditions.

11. The method of claim 6 wherein the alloy is electrically connected to earth ground.

* * * * *